May 26, 1970     A. HASSELBACH     3,513,594
CONTAINER FOR PREFORMED CUBES OF SOIL FOR PLANTS
Filed Aug. 31, 1967
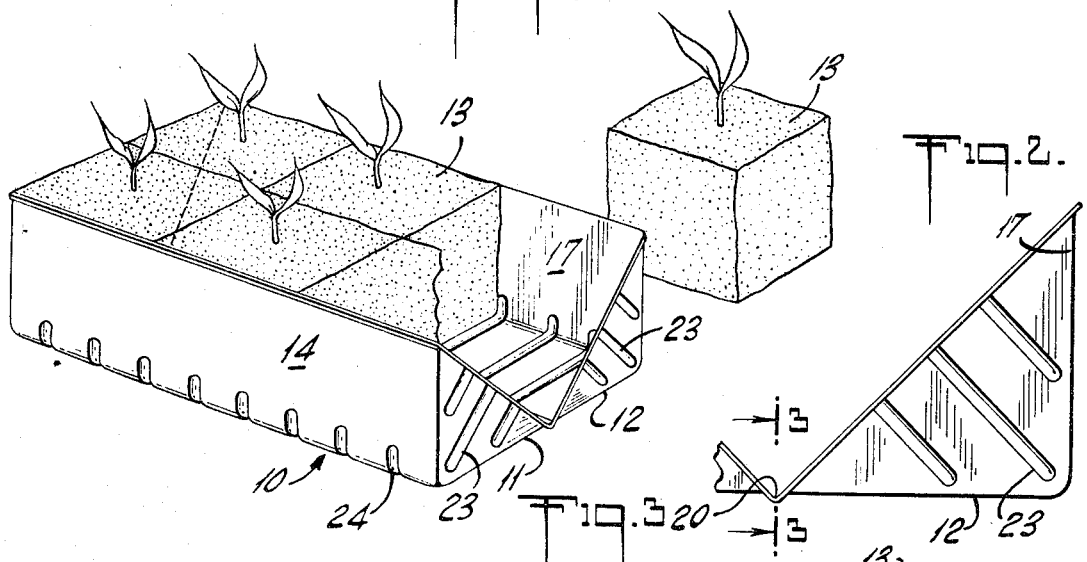
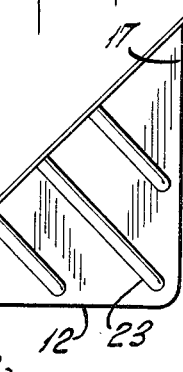
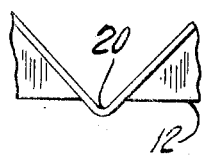
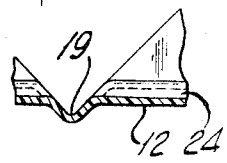
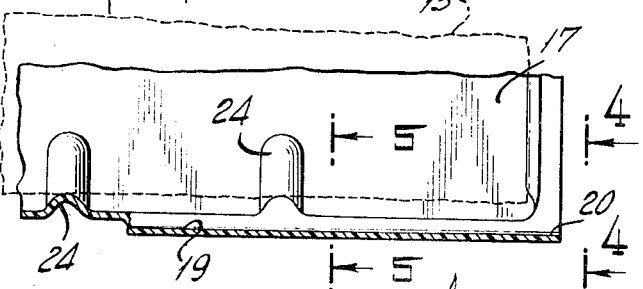
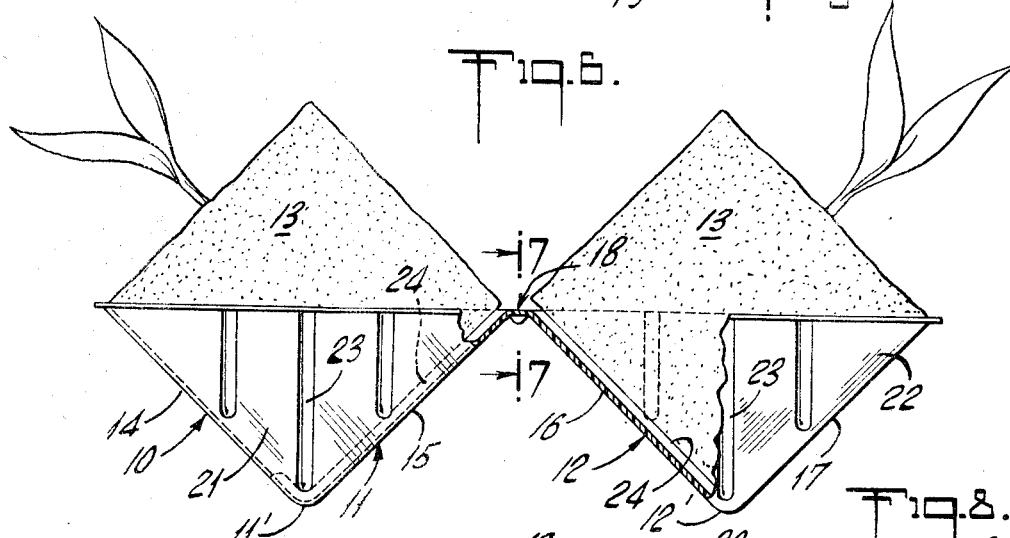
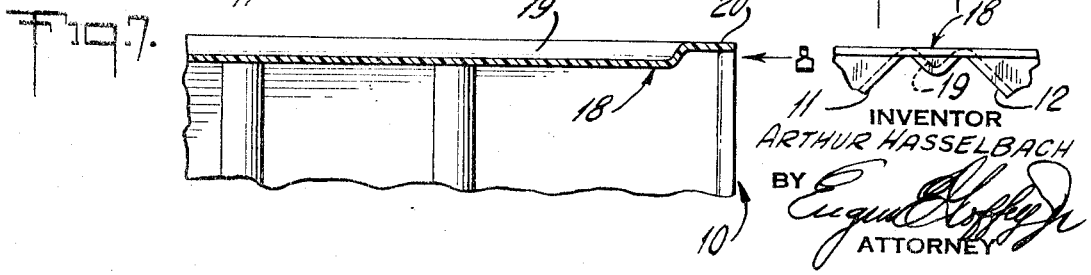
INVENTOR
ARTHUR HASSELBACH
BY
ATTORNEY

United States Patent Office 3,513,594
Patented May 26, 1970

3,513,594
CONTAINER FOR PREFORMED CUBES OF SOIL FOR PLANTS
Arthur Hasselbach, P.O. Box 336,
Cranbury, N.J. 08512
Filed Aug. 31, 1967, Ser. No. 664,883
Int. Cl. B65d *11/18;* A01g *9/10*
U.S. Cl. 47—37         3 Claims

ABSTRACT OF THE DISCLOSURE

A container for preformed cubes of soil for growing plants and formed of two triangular sections interconnected one to the other and which sections are movable from a position with the longitudinal edges coplanar to a position forming a substantially rectangular container for holding at least two rows of cubes.

---

This invention relates to containers for preformed cubes of soil for plants and more specifically to a novel and improved container that may be manufactured at a relatively low cost, affords drainage for the cubes of soil to prevent the retention of excess moisture during the growing of plants and facilitates removal of the cubes with the growing plants for transplantation.

One procedure for preparing seedlings and small plants for sale constitutes the formation of soil in the form of cubes having an opening in one side thereof for the reception of a seed or small plant. The cubes of soil are quite compact and retain their configuration under normal conditions. However, some protection must be afforded the cubes and prior containers have not been found entirely satisfactory because of their expense as well as the difficulty in removal of the cubes from the containers without disturbing the root structure of the plant. This invention overcomes the difficulties heretofore encountered in providing means for holding a plurality of cubes and provides a novel and improved container which may be nested for shipment and which may be readily formed into a rectangular container for holding at least two rows of cubes and providing drainage for the cubes to avoid the accumulation of excess moisture when stored in a humid atmosphere necessary for seed germination and growth.

Still another object of the invention resides in a novel and improved container for cubes of soil wherein the container is normally in the form of two triangular troughs and which troughs can be moved one relative to the other to form a rectangular container with a central drainage groove for removal of moisture.

Still another object of the invention resides in a novel and improved container for cubes of soil which facilitates insertion and removal of the cubes and in which the cubes may be supported during germination of the seeds and growth of the small plants and also provides a disposable container for the distribution and sale of the plants.

Still another object of the invention resides in a novel and improved container for plants.

The above and other objects of the invention will become more apparent from the following description and accompanying drawings forming part of this application.

In the drawings:

FIG. 1 is a perspective view of a container in accordance with the invention showing several soil cubes in position therein;

FIG. 2 is a fragmentary end view of the container shown in FIG. 1;

FIG. 3 is a fragmentary cross-sectional view of FIG. 2 taken along the line 3—3 thereof;

FIG. 4 is an end view of FIG. 3 taken in the direction of the arrows 4—4;

FIG. 5 is a cross-sectional view of FIG. 3 taken along the line 5—5 thereof;

FIG. 6 is an end view in partial section of the container in position at the time of insertion of the plant cubes, said container portions then being moved about a central longitudinal axis to the position shown in FIG. 1;

FIG. 7 is a cross-sectional view of FIG. 6 taken along line 7—7 thereof; and

FIG. 8 is an end view of FIG. 7 taken in the direction of the arrows 8—8.

Referring now to the drawings, the novel and improved container in accordance with the invention is denoted by the numeral 10 and is formed of two integrally connected elements or portions 11 and 12. The elements 11 and 12 are each of triangular configuration and normally occupy the position shown in FIG. 6. When preformed cubes of soil 13 are placed in the container 10, elements 11 and 12 form a rectangular structure as shown in FIG. 1. In the instant embodiment of the invention, the container is dimensioned so that it will receive and hold two rows of cubes 13 with three cubes in each row. The containers are particularly useful for commercial production of plants for distribution and sale since the grower can preform the cubes of soil 13, place them in containers and then insert seeds or seedlings into openings formed in the preformed cubes. A number of the containers 10 as shown in FIG. 1 may be placed in a holder formed of wood or other suitable material and stored in suitable greenhouses or the like until ready for sale. Thus the container provides a convenient means both for growing plants or seedlings and for distribution and sale thereof through nurseries, florists and the like.

FIGS. 6, 7, and 8 illustrate the form in which the container 10 is molded. Each portion 11 and 12 is of triangular configuration with the portion 11 having walls 14 and 15, and the portion 12 having walls 16 and 17. The upper edges of these walls are coplanar and the edges of the walls 15 and 16 are integrally joined at 18. The joinder 18 includes a longitudinal groove 19 which has its terminations in spaced relationship with the ends of the container as will be observed more clearly in FIG. 7. This arrangement thus provides a flat portion 20 at each end of the structure which flat portion holds the two trough-like sections 11 and 12 in the position shown in FIG. 6.

The container portions 11 and 12 are provided with end walls 21 and 22 respectively, and the end walls as well as the side walls are provided with inwardly formed ridges 23 and 24 which serve both as stiffening means as well as means for spacing the cubes 13 from the walls 15 and 16 which form the bottom wall when the container is in the position shown in FIG. 1. The ridges 24 in the walls 15 and 16 extend about the corners 11' and 12' of the portions 11 and 12 and partially up the side walls 14 and 17 of the portions 11 and 12 as will be observed more clearly in FIG. 1.

With the structure as described above the cubes of soil 13 may be inserted in the container 10 when in the position shown in FIG. 6 whereupon the portions of the container can then be moved annularly one relative to the other to assume the essentially rectangular configuration as shown in FIG. 1 whereupon the weight of the cubes 13 will retain the container in the rectangular configuration. When the portions 11 and 12 are displaced to assume the configuration shown in FIG. 1, the flat portions 20 adjoining the ends of the groove 19 will bend to form continuations of the ends of the groove 19 as shown in FIGS. 1, 2, and 4. With this arrangement, should the cubes absorb excess moisture when placed in a humid atmosphere, the water will condense and collect at the bottom of the container as shown in FIG. 1 and then be drained by the groove 19 and the end groove sections 20.

When it is desired to remove the cubes of soil with the growing plants from the container 10 as illustrated in FIG. 1 for transplantation, the two rows of cubes can be separated by merely gripping the sides of the container 10 and moving them to the position shown in FIG. 6. This separates the two rows of cubes whereupon each row may be removed from the container and individual cubes can then be separated easily one from the others.

While the container as described above may be formed of any suitable material, plastic materials such as polystyrene, polyethylene and the like which are suitable for molding have been found most desirable. The thickness of the material should be sufficient to provide adequate strength and at the same time be thin enough to permit the portions 20 to be bent without cracking. In the case of polystyrene, it has been found that a thickness in the range of .010" to .015" has produced excellent results.

While only one embodiment of the invention has been illustrated and described, it is apparent that alterations, modifications and changes may be made without departing from the true scope and spirit thereof as defined by the appended claims.

What is claimed is:

1. A container for preformed cubes of soil for plants comprising two elongated elements of triangular section each having side walls and end walls and means integrally joining a longitudinal edge of a side wall of one element to a longitudinal edge of a side wall of the other element to form a unitary structure with all longitudinal edges substantially coplanar, said joining means including a longitudinal groove having downwardly shapings ends, said elements being movable one relative to the other about said joining means to form a substantially rectangular container to receive at least two rows of said preformed cubes with the groove in said joining means forming a central drain for the removal of excess water, said cubes of soil retaining said elements in said rectangular configuration and being readily removable by movement of said elements one relative to the other to separate said rows of cubes one from the other.

2. A container according to claim 1 wherein the groove in said joining means forms flat end portions when said elements are pivoted about said joining means and away from each other.

3. A container according to claim 1 wherein the adjoining walls of said elements have inwardly formed ridges for supporting said cubes above the surface of said walls.

References Cited

UNITED STATES PATENTS

| 769,915 | 9/1904 | Nostrand. | |
| 3,164,478 | 1/1965 | Bostrom | 229—2.5 XR |
| 3,195,272 | 7/1965 | Mosher et al. | 47—37 |
| 3,333,760 | 8/1967 | Bridenstine | 229—44 |

FOREIGN PATENTS

| 1,307,886 | 9/1962 | France. |
| 71,638 | 11/1948 | Norway. |

ROBERT E. BAGWILL, Primary Examiner

U.S. Cl. X.R.

47—34.13; 206—44.12, 45.18; 220—30.5; 229—44